United States Patent
Safar (10) Patent No.: US 10,118,449 B2
(45) Date of Patent: Nov. 6, 2018

(54) SNOW CHAIN DEVICE FOR VEHICLE TIRE

(71) Applicant: Samir Hanna Safar, San Diego, CA (US)

(72) Inventor: Samir Hanna Safar, San Diego, CA (US)

(73) Assignee: Samir Hanna Safar, San Diego, CA (US)

( * ) Notice: Subject to any disclaimer, the term of this patent is extended or adjusted under 35 U.S.C. 154(b) by 109 days.

(21) Appl. No.: 15/401,049

(22) Filed: Jan. 8, 2017

(65) Prior Publication Data

US 2018/0194180 A1    Jul. 12, 2018

(51) Int. Cl.
*B60C 27/06* (2006.01)
*B60C 27/02* (2006.01)

(52) U.S. Cl.
CPC ........ *B60C 27/0284* (2013.01); *B60C 27/065* (2013.01); *B60C 27/067* (2013.01)

(58) Field of Classification Search
CPC . B60C 27/02; B60C 27/0207; B60C 27/0261; B60C 27/0284; B60C 27/04; B60C 27/08; B60C 27/16; B60C 27/20
See application file for complete search history.

(56) References Cited

U.S. PATENT DOCUMENTS

| | | | | |
|---|---|---|---|---|
| 4,303,116 A | * | 12/1981 | Holzwarth | B60C 27/06 152/224 |
| 4,481,990 A | * | 11/1984 | Rieger | B60C 27/08 152/172 |
| 5,044,411 A | * | 9/1991 | Doll | B60C 11/02 152/208 |
| 6,918,544 B2 | * | 7/2005 | Ferguson | B60C 11/16 152/208 |
| 9,469,170 B1 | * | 10/2016 | Tyszkiewicz | B60C 27/0292 |
| 2008/0190531 A1 | * | 8/2008 | Holeyfield | B60C 27/02 152/208 |
| 2014/0069559 A1 | * | 3/2014 | Hayot | B60C 11/02 152/208 |

* cited by examiner

*Primary Examiner* — Jason R Bellinger (57) ABSTRACT

A snow chain device for providing good traction to a vehicle tire on a snowy surface is described. The device is capable of being removably mounted on the tire with reduced physical effort and in multiple configurations. The device can be used in modular fashion and a range of patterns making it suitable for use on different tires as well as under varying driving conditions. Also it is possible to cover the entire surface of the tire as well as a partial surface. The device has several link members and several base members. The base members can be affixed to the external tire surface and the link members can be removably secured to the base members.

7 Claims, 6 Drawing Sheets

SNOW CHAIN DEVICE FOR VEHICLE TIRE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

The present invention belongs to the field of tire accessories for vehicles and more particularly relates to a novel snow chain device which can be mounted on a tire of a vehicle to provide good traction and braking performance on a snowy or icy surface, and thereby preventing the vehicle from skidding.

BACKGROUND OF THE INVENTION

A vehicle can easily run or stop in a normal environment, when there is the required level of friction between the tires and the ground. However, if there is ice or snow on the ground, the friction is reduced and the vehicle tends to lose control while driving. It is the usual practice to mount snow chains on tires of a vehicle to increase the friction while driving in snowy conditions, when the friction level between the ground surface and the tire is significantly reduced.

Conventional snow chains are available in various designs and models, but they still have several drawbacks, such as the associated difficulty while mounting on the tires. Several devices are meant just for the purpose of helping a user mount a snow chain on the tire. This is evident from U.S. Pat. No. 5,785,783 titled "Device for quickly fitting snow chains to vehicle tires" and U.S. Pat. No. 6,047,754 titled "Device for mounting snow chains on tires". These emphasize the issue of difficulty faced by a user in mounting the snow chains prevalent in known art.

Typically known snow chains are made of several chain rings and the chain is bent at places between the chain rings; but since each chain ring is rigid, so the snow chains cannot be attached or mounted on the tires firmly and completely. To mount the snow chain on the tire, the snow chain has a portion being pressed under the tire that makes the rest of the portion difficult to move. One has to adjust the chain rings to the right positions one by one and that is very hard and consumes lot of effort and time. To mount the snow chain on the tire is a heavy work, and it is a strenuous job for a weak person, or an elderly person, or a new hand. If the snow chain is not mounted firmly, then the chain might be fastened loosely and can pose a risk to the safety of the vehicle and the driver.

Below are given some of the known prior art.

U.S. Pat. No. 7,021,347 entitled "Snow chain for vehicle wheels" describes a snow chain that has a connection set having a plurality of planks, each of which has an arch portion and a connection portion. A radial chain set has a plurality of radial chains having ends coupled with the planks respectively. A main chain is coupled with distal ends of the radial chains, wherein the main chain has a hook device to connect opposite ends of the main chain into an annular form. A coupling assembly set has a plurality of coupling devices to tighten two of the planks, each of which has a rotary member and two connection member movably mounted on the rotary member.

U.S. Pat. No. 6,047,754 entitled "Device for mounting snow chains on tires" describes a device for mounting 3-railer snow chains having three runners on a set of double truck tires which are mounted on an outside wheel and an inside wheel. The device includes a non-elastic strap, a first wheel hook connected to a first end of the non-elastic strap for hooking the device to the inside wheel rim of the inside wheel, and a second wheel hook connected to a second end of the non-elastic strap for hooking the device to the outside wheel rim of the outside wheel. By driving forward or otherwise rotating the tire, the snow chains are tightly wrapped around the tire.

U.S. Pat. No. 5,785,783 titled "Device for quickly fitting snow chains to vehicle tires" describes a tire chain assembly including two stays hinged at one end on a housing and supporting wall chains which hold tread chains in place on the tread of the tire when they are pulled tight as the stays are drawn together by a resilient linkage. Arms or resilient linkages control displacement and vibration of the stays when the wheel is moving. The device enables gripping equipment to be fitted quickly and easily and is suitable for use on snow-covered, muddy, sandy, or vegetation-covered terrain.

Despite various improvements and progress in the field, some of the major obstacles that still exist are presented herein below.

The existing devices are heavy and bulky for the disabled, the physically handicapped, the elderly, the physically weak and the mechanically non-savvy people. The existing devices are not easy to install (mount) and uninstall (dismount) from the tire. If the device is not mounted correctly, or in a loose manner, then a link can come off and cause damage to the vehicle. The existing devices cannot be used in a modular fashion. Each device has a predefined size of chain links.

The existing devices cannot be installed on a given section of the tire and must be necessarily installed on the entire tire surface. They also do not have provisions for multiple configurations depending on the ground surface condition and medium, such as sand, snow, ice, mud.

The existing devices are not stackable so as to make it as deep as suitable for deeper traction in sand or mud. Also the existing devices do not fit all tires, and need different chain sizes so as to fit different sizes of tires. Another drawback is that they are not expandable, meaning that a bigger and heavier device is needed for larger and heavier vehicles and a smaller device in case the vehicle is lighter and smaller. The performance of the device varies as per weather conditions or surface of the ground since the same device is expected to perform well in different conditions.

The existing devices also cause considerable damage to the road.

Accordingly, improvements are needed in the existing devices that negate the above shortcomings.

It is observed that the purpose and methodology of all the above inventions that are part of prior art do not envisage the unique embodiment of a snow chain device for vehicle tires as described in the present application.

The scope of the invention is to be determined by the terminology of the following description, claims, drawings and the legal equivalents thereof.

SUMMARY OF THE INVENTION

The present invention may be summarized, at least in part, with reference to its objects.

It is therefore a primary objective of the present invention to provide a snow chain device capable of being mounted on a tire of a vehicle for good traction and braking performance while moving on a slippery surface, such as a snowy road.

Another objective of the present invention is to provide a novel snow chain device that is easy to mount and dismount onto a tire and does not require lot of physical effort.

Another objective of the present invention is to provide a novel snow chain device that is modular and allows different configurations depending on the tire of the vehicle and the ground surface conditions. Yet another objective is to allow partial coverage of the tire surface.

A further objective of the present invention is to provide a vertically stackable snow chain device, such that different layers of snow chains can be mounted above each other vertically in order to create a deeper or thicker snow chain as per the ground surface conditions.

A further objective of the present invention is to provide a novel snow chain device with better traction performance, and also does not cause deterioration of the road. The invention described herein thus comprises a novel snow chain device that can be used for providing good traction to a vehicle tire. The device is capable of being removably mounted on the tire with reduced effort and in multiple configurations, and in vertically stackable format.

The device includes
(a) a plurality of link members,
(b) a plurality of base members,
(c) a plurality of adhesive strips, corresponding in equal number to said plurality of base members.

Each link member further includes a chain member and an arch member. Each arch member has a top surface, a bottom surface and a plurality of projections at predefined locations on its bottom surface. The chain member is affixed on the top surface of the arch member. The arch member is shaped to conform substantially to the curvature of the tire. Each base member has a top surface including recessed portions and a bottom surface. The base member is capable of being affixed to an external tire surface, and has a plurality of holes at predefined locations. Each adhesive strip includes a peelable, adhesive front surface, that faces the bottom surface of the base member, and a peelable, adhesive back surface, that faces the external tire surface. The base members are affixed on the external tire surface by means of the adhesive strips. The link members are positioned vertically above the base members, such that the projections of the link members engage with the corresponding holes of the base members. The link members are removably secured with the base members and form a predefined configuration on the external surface of the tire.

The above summary is intended to illustrate exemplary embodiments of the invention, which will be best understood in conjunction with the detailed description to follow, and are not intended to limit the scope of the invention.

Additional objects and embodiments of the invention will be set forth in part in the description which follows, and in part will become apparent to those skilled in the art upon examination of the following, or may be learned by practice of the invention. Thus these and other objects of the present invention will be more readily apparent when considered in reference to the following description and when taken in conjunction with the accompanying drawings.

LIST OF REFERENCE NUMBERING 10 labels a snow chain device in accordance with the present invention
20 labels a link member
21 labels a chain
22 labels an arch member
23 labels a projection
30 labels a base member
32 labels a recessed top surface
34 labels a hole
40 labels an adhesive strip
41 labels a peelable top surface of the adhesive strip
42 labels a peelable bottom surface of the adhesive strip
60 labels a tire

DETAILED DESCRIPTION OF THE INVENTION

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

The following description is presented to enable any person skilled in the art to make and use the invention, and is provided in the context of particular applications of the invention and their requirements.

The invention described herein thus comprises a novel, snow chain device for providing good traction to a vehicle tire. Said device is capable of being removably mounted on the tire with reduced effort and in multiple configurations as well as in a stackable format. The device comprising:

(a) a plurality of link members,
(b) a plurality of base members,
(c) a plurality of adhesive strips, corresponding in equal number to said plurality of base members.

Each link member further includes a chain member and an arch member. Each arch member has a top surface, a bottom surface and a plurality of projections at predefined locations on its bottom surface. The chain member is affixed on the top surface of the arch member. The arch member is shaped to conform substantially to the curvature of the tire. Each base member has a top surface including recessed portions and a bottom surface. The base member is capable of being affixed to an external tire surface, and has a plurality of holes at predefined locations. Each adhesive strip includes a peelable, adhesive front surface, that faces the bottom surface of the base member, and a peelable, adhesive back surface, that faces the external tire surface. The base members are affixed on the external tire surface by means of the adhesive strips. The link members are positioned vertically above the base members, such that the projections of the link members engage with the corresponding holes of the base members. The link members are removably secured with the base members and form a predefined configuration on the external surface of the tire.

Figure 1:
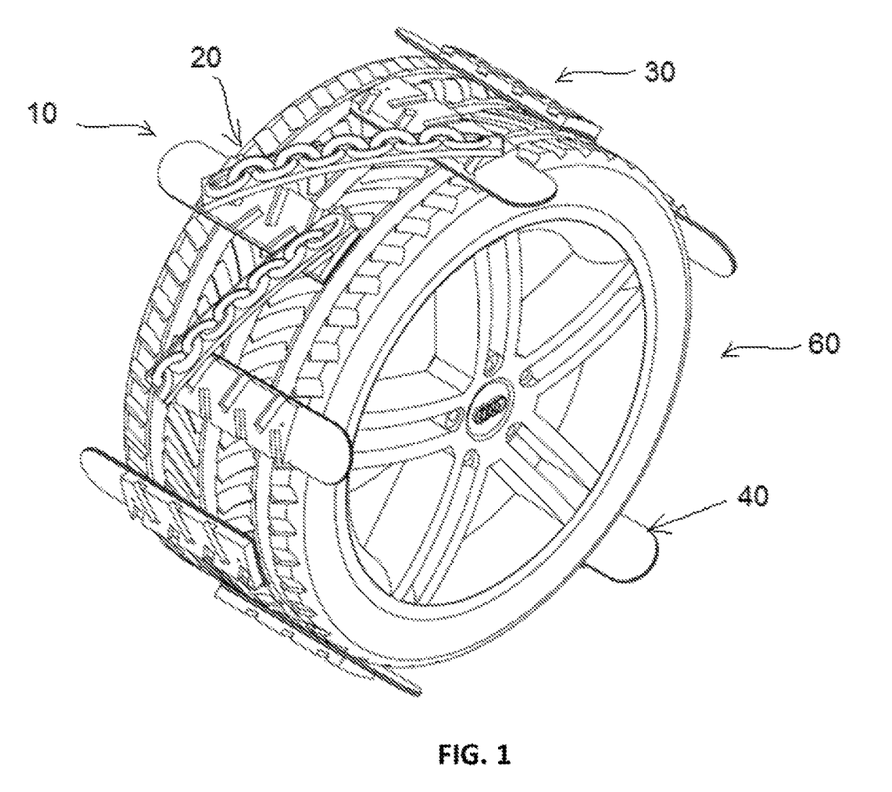
FIG. 1 is an illustrative perspective view depicting a snow chain device, partly assembled, according to the present invention mounted on the tire of a vehicle.

FIG. 1 depicts a perspective view of a snow chain device 10 in accordance with the present invention, mounted on a tire 60. Link members 20, base members 30 and adhesive strips 40 are also shown. In this view, only a part of the link members have been positioned on base members.

Figure 2:
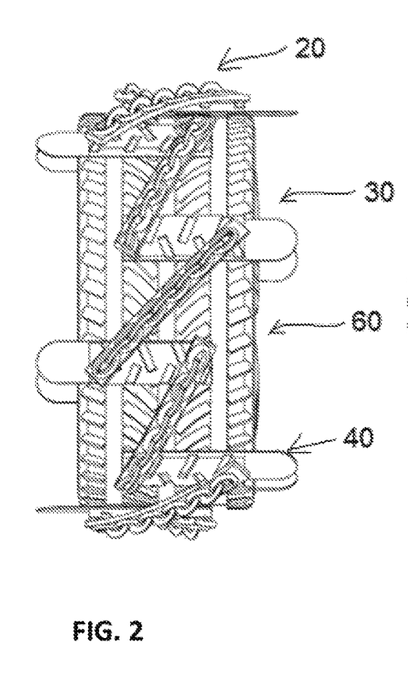
FIG. 2 is a front view of a snow chain device, according to the present invention, mounted on the tire of a vehicle.

FIG. 2 depicts a front view of a snow chain device 10 in accordance with the present invention, mounted on a tire 60. Link members 20, base members 30 and adhesive strips 40 are also shown.

Figure 3:
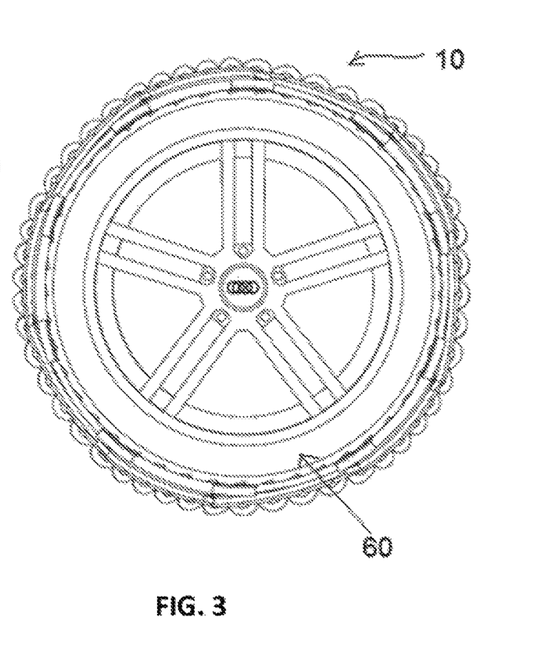
FIG. 3 is a side view of a snow chain device, according to the present invention, mounted on the tire of a vehicle.

FIG. 3 depicts a side view of a snow chain device 10 in accordance with the present invention, mounted on a tire 60.

Figure 4A:
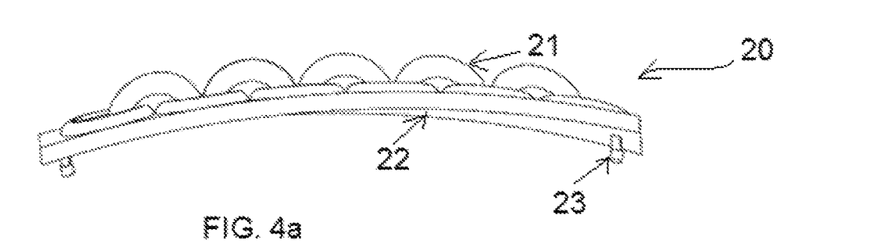
FIGS. 4a, 4b and 4c are illustrative diagrams depicting a link member.
Figure 4B:
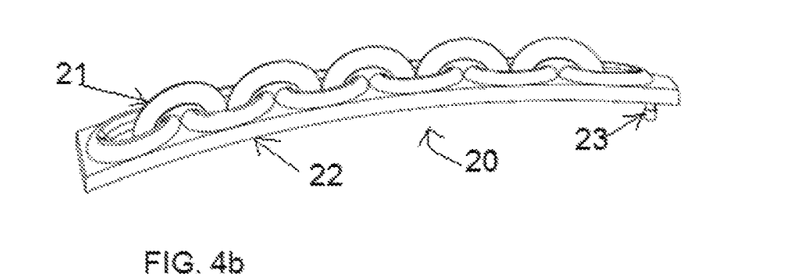
Figure 4C:
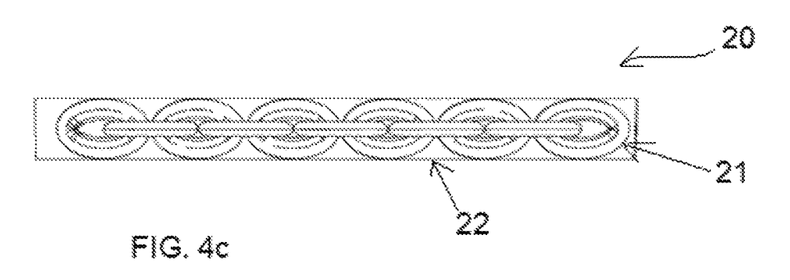

FIGS. 4a, 4b and 4c depict three alternate views of a link member 20. 21 is a chain affixed to an arch member 22. The arch member 22 is shaped to conform substantially to the curvature of the tire and has projections 23 on its bottom surface.

Figure 5A:
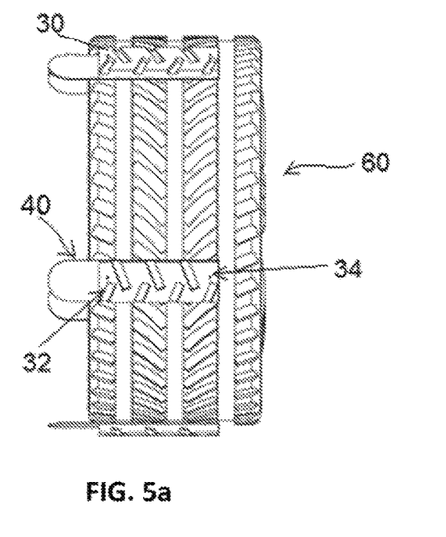
FIGS. 5a and 5b are illustrative diagrams depicting base members mounted on the tire in two different configurations.

FIG. 5a represents an illustrative view depicting base members 30 having a recessed top surface 32 and a plurality of holes 34, affixed on adhesive strip 40, which is affixed on the tire 60, in a given configuration of the base members.

Figure 5B:
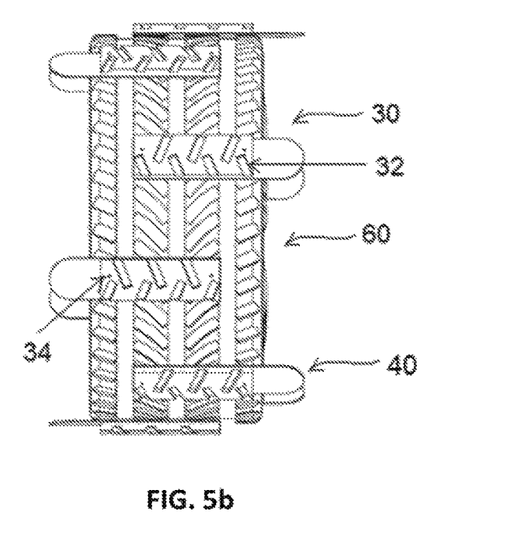

FIG. 5b is an illustrative diagram depicting a base member 30 having a recessed top surface 32 and a plurality of holes 34, affixed on adhesive strip 40, which is affixed on the tire 60, in an alternate configuration of the base members.

Figure 6:
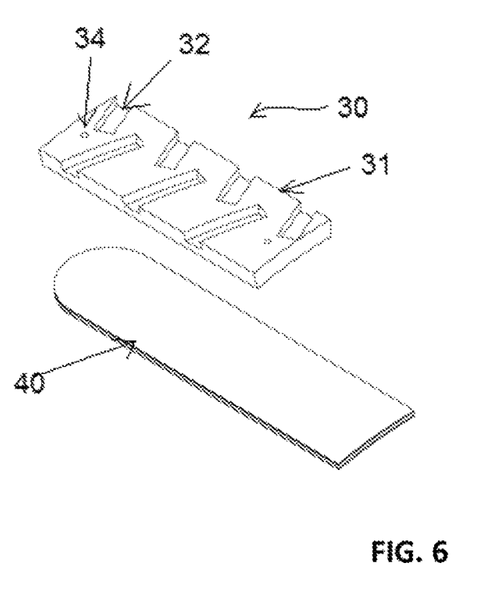
FIG. 6 is an illustrative diagram depicting a base member and an adhesive strip.

FIG. 6 is an illustrative diagram depicting a base member 30 having a recessed top surface 32 and a plurality of holes 34, positioned above an adhesive strip 40.

Figure 7:
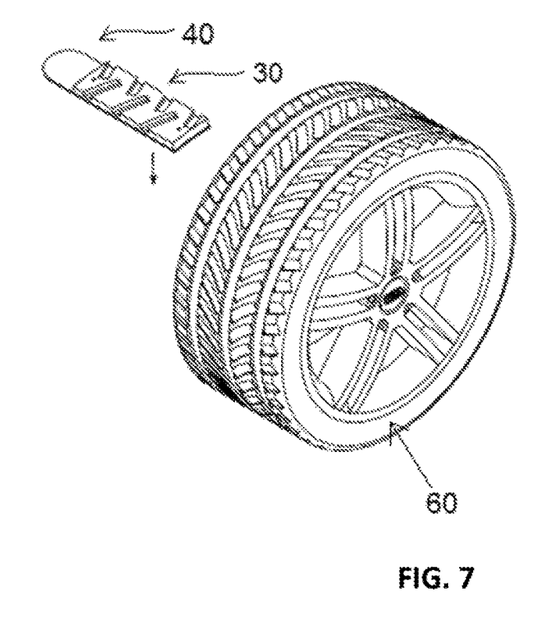
FIG. 7 is an illustrative diagram depicting a base member and an adhesive strip prior to being affixed on an external surface of a tire.

FIG. 7 is an illustrative diagram depicting a base member 30 and an adhesive strip 40 prior to being affixed on an external surface of a tire 60.

Figure 8A:
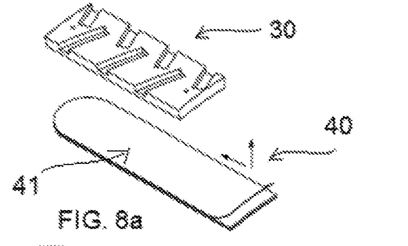
FIGS. 8a, 8b and 8c are illustrative diagrams depicting a base member in conjunction with a peelable top surface of an adhesive strip.
Figure 8B:
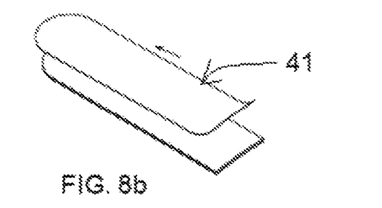
Figure 8C:
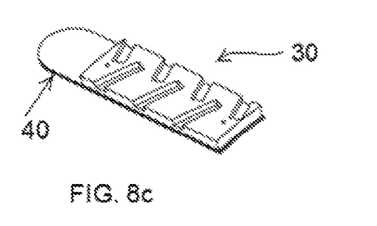

FIGS. 8a, 8b and 8c are illustrative diagrams depicting a base member 30 in conjunction with a peelable top surface 41 of an adhesive strip 40.

Figure 9A:
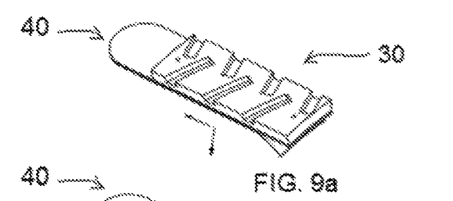
FIGS. 9a, 9b and 9c are illustrative diagrams depicting a base member in conjunction with a peelable back surface of an adhesive strip.
Figures 9B, 9C:
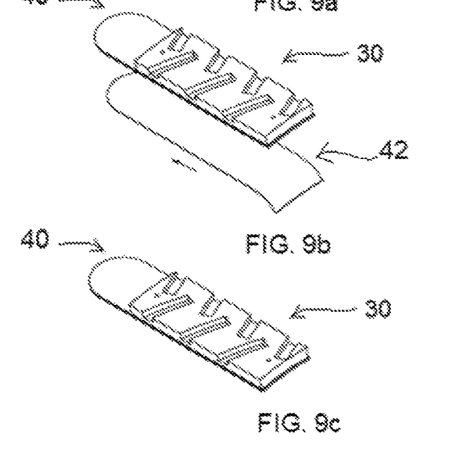

FIGS. 9a, 9b and 9c are illustrative diagrams depicting a base member 30 in conjunction with a peelable back surface 42 of an adhesive strip 40.

In an embodiment of the invention, it is possible to cover an entire external surface of a tire using the present snow chain device.

In an alternate embodiment of the invention, the present snow chain device can be used to partly cover a specific surface area of a tire.

In one embodiment of the invention, it possible to vertically stack multiple layers of base members and chain members to create a device with greater thickness for higher traction. In such an embodiment, additional layers of adhesive strips are required between the layer of base members and the layer of link members.

In one embodiment of the invention, it is possible to arrange the base members and link members in any number of symmetric or unsymmetrical pattern as desired depending on the level of traction required. The link members can be in any possible size and design pattern.

The present invention is easy to mount or dismount since the link members can be removably secured to the base members. The base members are fastened on the external surface of a tire using adhesive layer having a peelable top surface and a peelable bottom surface. The adhesive layers may be made of 3M Command® double side strip adhesive tape, for example. The adhesive strips are disposable and need to be disposed off after each use. The base members and the link members can be reused.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A snow chain device for providing traction to a vehicle tire, said device capable of being removably mounted on the tire and in multiple configurations, and said device comprising:

(a) a plurality of link members,
    wherein a link member comprises:
        a chain member and,
        an arch member, having a top surface, a bottom surface and a plurality of projections at predefined locations on the bottom surface of the arch member, wherein,
            the chain member is affixed on the top surface of the arch member, and,
            the arch member is shaped to conform substantially to the curvature of the tire;
(b) a plurality of base members,
    wherein a base member comprises: a top surface including recessed portions, and a bottom surface;
        is capable of being affixed to an external tire surface, and
        has a plurality of holes at predefined locations;
(c) a plurality of adhesive strips, corresponding in equal number to said plurality of base members, wherein each adhesive strip comprises: a peelable, adhesive front surface facing the bottom surface of the base member, and a peelable, adhesive back surface, facing the external tire surface;

wherein, said base members being affixed on the external tire surface by means of said plurality of adhesive strips; and said plurality of link members being positioned vertically above the plurality of base members, such that said plurality of projections of the link members engage with the corresponding holes of the plurality of base members, to removably secure the plurality of link members with the plurality of base members and form a predefined configuration on the external surface of the tire.

2. A snow chain device as claimed in claim 1 wherein the device covers an entire external surface of the tire.

3. A snow chain device as claimed in claim 1 wherein the device covers a partial external surface of the tire.

4. A snow chain device as claimed in any of the claims 1-3, wherein the same device can be used for different sizes of tires.

5. A snow chain device as claimed in any of the claims 1-3, which is capable of providing an increased coefficient of friction to the tire to avoid skidding of the vehicle without damaging the road surface.

6. A snow chain device as claimed in any of the claims 1-3, which allows multiple configurations depending on the condition of the ground surface.

7. A snow chain device as claimed in any of the claims 1-3, wherein the plurality of base members and the plurality of link members can be arranged in any number of symmetric or unsymmetrical patterns depending on the level of traction required.

* * * * *